US012126658B2

(12) United States Patent
Peinado Gomez et al.

(10) Patent No.: US 12,126,658 B2
(45) Date of Patent: Oct. 22, 2024

(54) SECURITY ENFORCEMENT AND ASSURANCE UTILIZING POLICY CONTROL FRAMEWORK AND SECURITY ENHANCEMENT OF ANALYTICS FUNCTION IN COMMUNICATION NETWORK

(71) Applicant: Nokia Technologies Oy, Espoo (FI)

(72) Inventors: German Peinado Gomez, Warsaw (PL); Anja Jerichow, Grafing bei München (DE); Chaitanya Aggarwal, Munich (DE)

(73) Assignee: Nokia Technologies Oy, Espoo (FI)

( * ) Notice: Subject to any disclaimer, the term of this patent is extended or adjusted under 35 U.S.C. 154(b) by 199 days.

(21) Appl. No.: 17/702,887

(22) Filed: Mar. 24, 2022

(65) Prior Publication Data
US 2022/0321607 A1 Oct. 6, 2022

Related U.S. Application Data

(60) Provisional application No. 63/170,148, filed on Apr. 2, 2021.

(51) Int. Cl.
*H04L 9/40* (2022.01)
(52) U.S. Cl.
CPC .................. *H04L 63/205* (2013.01)
(58) Field of Classification Search
CPC ......... H04L 63/205; H04L 63/20; H04L 9/40; H04W 12/088; H04W 12/08; H04W 12/12
See application file for complete search history.

(56) References Cited

U.S. PATENT DOCUMENTS

| | | | |
|---|---|---|---|
| 2019/0173908 A1* | 6/2019 | Couturier | H04L 63/1425 |
| 2019/0215693 A1 | 7/2019 | Lee et al. | |
| 2020/0195693 A1 | 6/2020 | Price et al. | |

(Continued)

FOREIGN PATENT DOCUMENTS

| | | |
|---|---|---|
| CN | 109787799 A | 5/2019 |
| WO | 2020/034864 A1 | 2/2020 |
| WO | 2020/178159 A1 | 9/2020 |

(Continued)

OTHER PUBLICATIONS

Extended European Search Report received for corresponding European Patent Application No. 22162923.1, dated Aug. 19, 2022, 7 pages.

(Continued)

*Primary Examiner* — Quazi Farooqui
(74) *Attorney, Agent, or Firm* — Duft & Bornsen, PC

(57) ABSTRACT

Techniques for dynamic security management in a communications network are disclosed. For example, a method comprises obtaining, at a network entity in a communication network, security information from one or more other network entities in the communication network. In response to at least a portion of the obtained security information, the method enables, by the network entity, dynamic enforcement within a user plane of the communication network of one or more security policies in accordance with one or more quality-of-service policies to manage one or more behaviors of user equipment.

20 Claims, 10 Drawing Sheets

(56) References Cited

U.S. PATENT DOCUMENTS

2020/0228975 A1* 7/2020 Li ..................... H04W 28/0268
2022/0182896 A1* 6/2022 Talebi Fard ...... H04W 36/0085

FOREIGN PATENT DOCUMENTS

WO 2022/027342 A1 2/2022
WO 2022/027572 A1 2/2022

OTHER PUBLICATIONS

Peinado Gomez et al., "Security policies definition and enforcement utilizing policy control function framework in 5G", Computer Communications, vol. 172, No. C, Apr. 2021, pp. 226-237.

"3rd Generation Partnership Project; Technical Specification Group Services and System Aspects; System architecture for the 5G System (5GS); Stage 2 (Release 17)", 3GPP TS 23.501, V17.0.0, V17.0.0, Mar. 2021, pp. 1-489.

"3rd Generation Partnership Project; Technical Specification Group Services and System Aspects; Study on security aspects of enablers for Network Automation (eNA) for the 5G system (5GS) Phase 2; (Release 17)", 3GPP TR 33.866, V0.4.0, Mar. 2021, pp. 1-30.

"3rd Generation Partnership Project; Technical Specification Group Services and System Aspects; System architecture for the 5G System (5GS); Stage 2 (Release 16)", 3GPP TS 23.501 V16.7.0, Dec. 2020, pp. 1-450.

"3rd Generation Partnership Project; Technical Specification Group Services and System Aspects; Policy and charging control framework for the 5G System (5GS); Stage 2 (Release 16)", 3GPP TS 23.503, V16.7.0, Dec. 2020, pp. 1-119.

"3rd Generation Partnership Project; Technical Specification Group Services and System Aspects; Security architecture and procedures for 5G system (Release 17)", 3GPP TS 33.501, V17.0.0, Dec. 2020, pp. 1-253.

"3rd Generation Partnership Project; Technical Specification Group Services and System Aspects; Procedures for the 5G System (5GS); Stage 2 (Release 16)", 3GPP TS 23.502, V16.7.1, Jan. 2021, pp. 1-603.

"Quality of service", Wikipedia, Retrieved on Mar. 16, 2022, Webpage available at : https://en.wikipedia.org/wiki/Quality_of_service.

"Telephony", Wikipedia, Retrieved on Mar. 16, 2022, Webpage available at : https://en.wikipedia.org/wiki/Telephony.

"Definitions of terms related to quality of service", Quality of telecommunication services: concepts, models, objectives and dependability planning—Terms and definitions related to the quality of telecommunication services, Series E: Overall Network Operation, Telephone Service, Service Operation and Human Factors, Recommendation ITU-T E.800, Sep. 2008, 30 pages.

"3rd Generation Partnership Project; Technical Specification Group Services and System Aspects; Architecture enhancements for 5G System (5GS) to support network data analytics services (Release 16)", 3GPP TS 23.288, V16.6.0, Dec. 2020, pp. 1-67.

"3rd Generation Partnership Project; Technical Specification Group Services and System Aspects; Study on enablers for network automation for the 5G System (5GS); Phase 2 (Release 17)", 3GPP TR 23.700-91, V17.0.0, Dec. 2020, pp. 1-382.

"3rd Generation Partnership Project; Technical Specification Group Services and System Aspects; Study on the Security for 5G Urllc (Release 16)", 3GPP TR 33.825, V0.4.0, Mar. 2019, pp. 1-22.

"GTPv1-U—GPRS Tunnelling Protocol v1—User", MPirical, Retrieved on Mar. 16, 2022, Webpage available at : https://www.mpirical.com/glossary/gtpv1-u-gprs-tunnelling-protocol-v1-user.

* cited by examiner

| Analytics Information | Request Description | Response Description | Security Insights |
|---|---|---|---|
| Slice load level information | Analytics ID: load level information | Load level of a network slice instance reported either as notification of crossing of a given threshold or as periodic notification (if no threshold is provided). | (D)DoS specific thresholds based on volume and time |
| Observed service experience information | Analytics ID: Service experience | Observed service experience statistics or predictions may be provided for a network slice instance or an application. They may be derived from an individual UE, a group of UEs or any UE. For slice service experience, they may be derived from an application, a set of applications or all applications on the network slice instance. | Key information to be communicated to security analytics platform. For example, an observation of a quality degradation of service experience in browsing could be a signal of a flooding attack on DNS resolvers. |
| NF Load information | Analytics ID: NF load information | Load statistics or predictions information for specific NF(s). | DoS specific thresholds based on volume and time for specific NFs (e.g. IMS AF with direct access to UEs |
| UE Abnormal behaviour information | Analytics ID: Abnormal behaviour | List of observed or expected exceptions, with Exception ID, Exception Level and other information, depending on the observed or expected exceptions. | For further security analysis from the network security analytics platforms on the UE behaviour |
| User Data Congestion information | Analytics ID: User data congestion | Statistics or predictions on the user data congestion for transfer over the user plane, for transfer over the control plane, or for both. | Security issue against availability of the service |
| QoS Sustainability | Analytics ID: QoS sustainability | For statistics, the information on the location and the time for the QoS change and the threshold(s) that were crossed; or, for predictions, the information on the location and the time when a potential QoS change may occur and what threshold(s) may be crossed | Due to a security attack a potential QoS change may occur, e.g. where DlQoS volume/time thresholds have been surpassed |

FIG. 7

SECURITY ENFORCEMENT AND ASSURANCE UTILIZING POLICY CONTROL FRAMEWORK AND SECURITY ENHANCEMENT OF ANALYTICS FUNCTION IN COMMUNICATION NETWORK

FIELD

The field relates generally to communication systems, and more particularly, but not exclusively, to security management of user equipment identifiers.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB) is illustratively part of an access network of the communication system. For example, in a 5G network, the access network referred to as a 5G AN is described in 5G Technical Specification (TS) 23.501, entitled "Technical Specification Group Services and System Aspects; System Architecture for the 5G System," and TS 23.502, entitled "Technical Specification Group Services and System Aspects; Procedures for the 5G System (5GS)," the disclosures of which are incorporated by reference herein in their entireties. In general, the access point (e.g., gNB) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues associated with user equipment identifiers can present a significant challenge.

SUMMARY

Illustrative embodiments provide techniques for dynamic security management in a communication network.

For example, in one illustrative embodiment, a method comprises obtaining, at a network entity in a communication network, security information from one or more other network entities in the communication network. In response to at least a portion of the obtained security information, the method enables, by the network entity, dynamic enforcement within a user plane of the communication network of one or more security policies in accordance with one or more quality-of-service policies to manage one or more behaviors of user equipment across the communication network.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

Advantageously, illustrative embodiments provide dynamic user plane security enforcement within session management and security policies to consider security as a quality element of the communication network. In one or more illustrative embodiments, a policy control function enables the dynamic enforcement.

These and other features and advantages of embodiments described herein will become more apparent from the accompanying drawings and the following detailed description.

BRIEF DESCRIPTION OF THE DRAWINGS

FIG. 7 illustrates a security-enhanced analytics information table, according to an illustrative embodiment.

DETAILED DESCRIPTION

Embodiments will be illustrated herein in conjunction with example communication systems and associated techniques for security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other conventional details that one of ordinary skill in the art will realize. For example, 3GPP TS 23.503 entitled "Technical Specification Group Services and System Aspects; Policy and Charging Control Framework for the 5G System (5GS);" TS 23.288 entitled "Technical Specification Group Services and System Aspects; Architecture Enhancements for 5G System (5GS) to Support Network Data Analytics Services;" TR 23.700-91 entitled "Technical Specification Group Services and System Aspects; Study on enablers for network automation for the 5G System (5GS); Phase 2;" and TR 33.866 entitled "Technical Specification Group Services and System Aspects; Study on Security Aspects of Enablers for Network Automation (eNA) for the 5G System (5GS) Phase 2;" the disclosures of which are incorporated by reference herein in their entireties, may also be mentioned below in the context of some illustrative embodiments. However, while well-suited for 5G-related 3GPP standards, embodiments are not necessarily intended to be limited to any particular standards.

Illustrative embodiments provide definition and enforcement of security policies using a policy control framework, enabled by enhanced security analytics, to reach a per subscription (e.g., per UE) granularity. Prior to describing illustrative embodiments, a general description of certain main components of a 5G network will be described below in the context of FIGS. 1 and 2.

Figure 1:
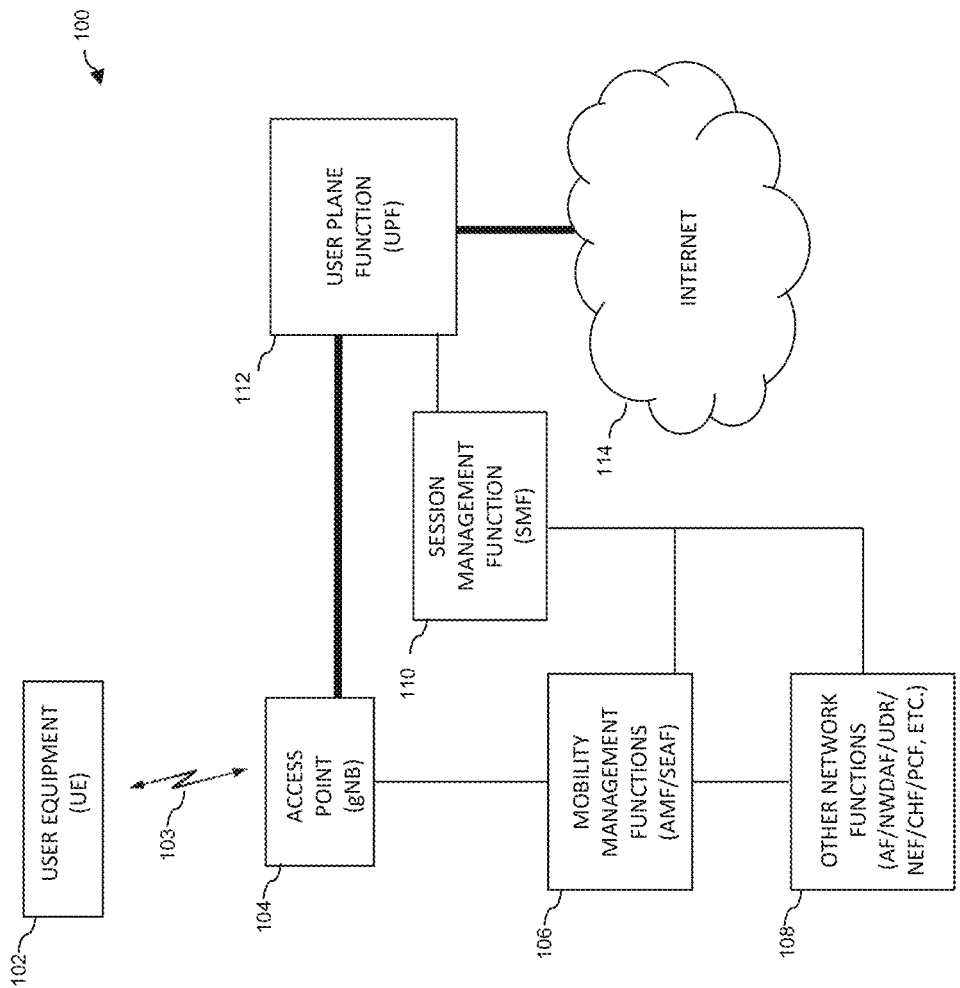
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, at least some functions that facilitate an explanation of illustrative embodiments are represented. Subsequent figures may depict some additional elements/functions (i.e., network entities).

Accordingly, as shown, communication system 100 comprises user equipment (UE) 102 that communicates via an air interface 103 with an access point (gNB) 104. It is to be understood that UE 102 may use one or more other types of access points (e.g., access functions, networks, etc.) to communicate with the 5G core other than a gNB. By way of example only, the access point 104 may be any 5G access network such as an N3IWF (Non-3GPP Interworking Function), a TNGF (Trusted Non-3GPP Gateway Function) or a W-AGF (Wireline Access Gateway Function) or may correspond to a legacy access point (e.g., eNB).

The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores a permanent subscription identifier and its related key, which are used to uniquely identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) unique to the UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI). Another example of a SUPI uses a Network Access Identifier (NAI). NAI is typically used for IoT communication.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to other network functions 108. As shown, some of these other network functions 108 include, but are not limited to, an Application Function (AF), a Network Data Analytics Function (NWDAF), a Unified Data Repository (UDR), a Network Exposure Function (NEF), a Charging Function (CHF), a Policy Control Function (PCF), and others.

Note that a UE, such as UE 102, is typically subscribed to what is referred to as a Home Public Land Mobile Network (HPLMN) in which some or all of the functions 106 and 108 reside. The HPLMN is also referred to as the Home Environment (HE). If the UE is roaming (not in the HPLMN), it is typically connected with a Visited Public Land Mobile Network (VPLMN) also referred to as a visited or serving network. In such case, some of the network functions 106 and 108 can reside in the VPLMN, in which case, functions in the VPLMN communicate with functions in the HPLMN as needed. However, in a non-roaming scenario, mobility management functions 106 and the other network functions 108 reside in the same communication network, i.e. HPLMN. Embodiments described herein are not limited by which functions reside in which PLMN (i.e., HPLMN or VPLMN).

The access point 104 is also operatively coupled (via one or more of functions 106 and/or 108) to a serving gateway function, i.e., Session Management Function (SMF) 110, which is operatively coupled to a User Plane Function (UPF) 112. UPF 112 is operatively coupled to a Packet Data Network, e.g., Internet 114. Note that the thicker solid lines in this figure denote a user plane (UP) of the communication network, as compared to the thinner solid lines that denote a control plane (CP) of the communication network. It is to be appreciated that network 114 in FIG. 1 may additionally or alternatively represent other network infrastructures including, but not limited to, cloud computing infrastructure and/or Edge computing infrastructure. Further typical operations and functions of such network elements are not described here since they are not the focus of the illustrative embodiments and may be found in appropriate 3GPP 5G documentation. Note that functions shown in 106, 108, 110 and 112 are examples of network functions (NFs).

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
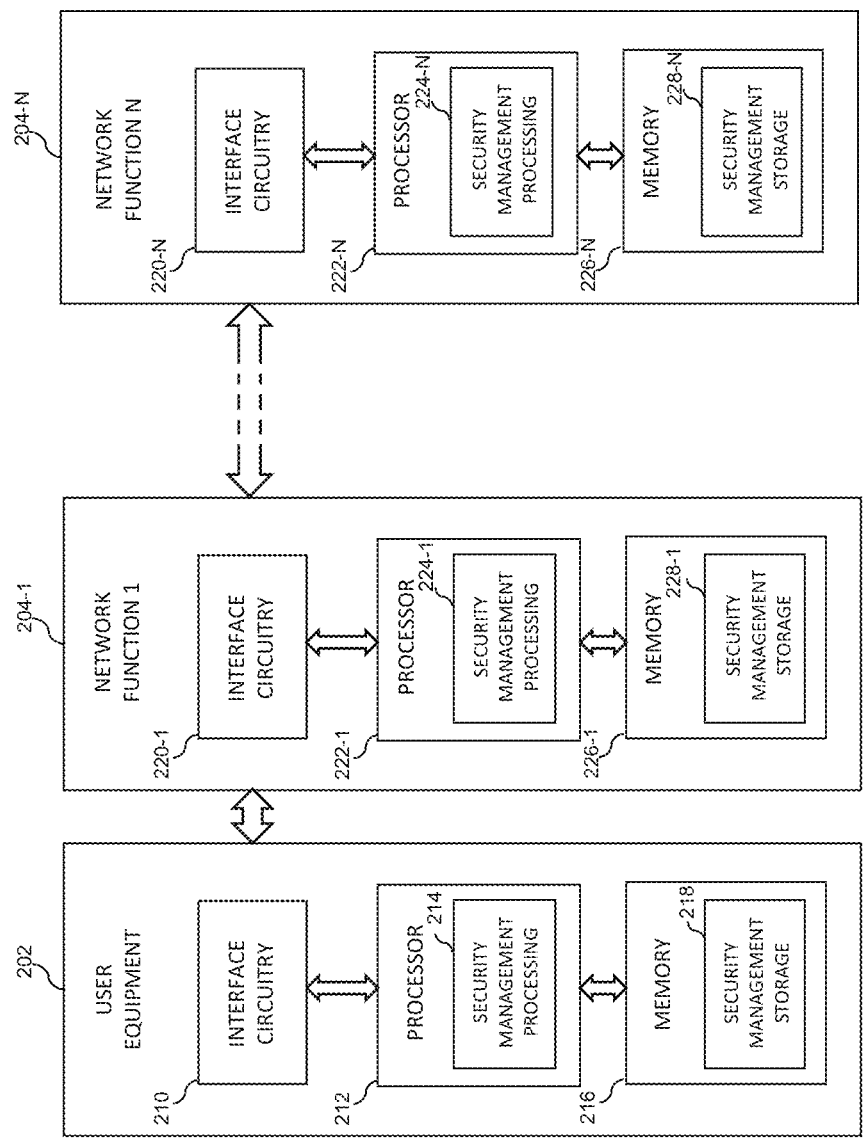
FIG. 2 illustrates user equipment and network entities with which one or more illustrative embodiments may be implemented.

FIG. 2 is a block diagram illustrating computing architectures for various participants in methodologies according to illustrative embodiments. More particularly, system 200 is shown comprising user equipment (UE) 202 and a plurality of network entities 204-1, . . . 204-N. For example, in illustrative embodiments and with reference back to FIG. 1, UE 202 can represent UE 102, while network entities 204-1, . . . , 204-N can represent functions 106 and 108. It is to be appreciated that the UE 202 and network entities 204-1, . . . 204-N are configured to interact to provide security management and other techniques described herein.

The user equipment 202 comprises a processor 212 coupled to a memory 216 and interface circuitry 210. The processor 212 of the user equipment 202 includes a security management processing module 214 that may be implemented at least in part in the form of software executed by the processor. The processing module 214 performs security management described in conjunction with subsequent figures and otherwise herein. The memory 216 of the user equipment 202 includes a security management storage module 218 that stores data generated or otherwise used during security management operations.

Each of the network entities (individually or collectively referred to herein as 204) comprises a processor 222 (222-1, . . . , 222-N) coupled to a memory 226 (226-1, . . . , 226-N) and interface circuitry 220 (220-1, . . . , 220-N). Each processor 222 of each network entity 204 includes a security management processing module 224 (224-1, . . . , 224-N) that may be implemented at least in part in the form of software executed by the processor 222. The processing module 224 performs security management operations described in conjunction with subsequent figures and otherwise herein. Each memory 226 of each network entity 204 includes a security management storage module 228 (228-1, . . . , 228-N) that stores data generated or otherwise used during security management operations.

The processors 212 and 222 may comprise, for example, microprocessors such as central processing units (CPUs), application-specific integrated circuits (ASICs), digital signal processors (DSPs) or other types of processing devices, as well as portions or combinations of such elements.

The memories 216 and 226 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 and 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

Further, the memories 216 and 226 may more particularly comprise, for example, electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 illustratively comprise transceivers or other communication hardware or firmware that allows the associated system elements to communicate with one another in the manner described herein.

It is apparent from FIG. 2 that user equipment 202 and plurality of network entities 204 are configured for communication with each other as security management participants via their respective interface circuitries 210 and 220. This communication involves each participant sending data to and/or receiving data from one or more of the other participants. The term "data" as used herein is intended to be construed broadly, so as to encompass any type of information that may be sent between participants including, but not limited to, identity data, key pairs, key indicators, security management messages, registration request/response messages and data, request/response messages, authentication request/response messages and data, control data, audio, video, multimedia, other messages, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as gNB 104, SMF 110, and UPF 112 may each be configured to include components such as a processor, memory and network interface. These elements need not be implemented on separate stand-alone processing platforms, but could instead, for example, represent different functional portions of a single common processing platform.

More generally, FIG. 2 can be considered to represent processing devices configured to provide respective security management functionalities and operatively coupled to one another in a communication system.

As mentioned above, the 3GPP TS 23.501 defines the 5G system architecture as service-based, e.g., Service-Based Architecture (SBA). It is realized herein that in deploying different NFs, there can be many situations where an NF may need to interact with an entity external to the SBA-based 5G core network (e.g., including the corresponding PLMN(s), e.g., HPLMN and VPLMN). Thus, the term "internal" as used herein illustratively refers to operations and/or communications within the SBA-based 5G core network (e.g., SBA-based interfaces) and the term "external" illustratively refers to operations and/or communications outside the SBA-based 5G core network (non-SBA interfaces). By way of example only, NEF may need to interact with an application function residing, at least in part, on a server managed by a third-party enterprise ("third-party" here illustratively refers to a party other than the network operator of the SBA-based 5G core network). Using 5G approaches, this results in NEF supporting multiple services both internally and externally at the same time. Internally, NEF may provide services to other internal functions as well as multiple UEs, while at the same time interacting with an external server (e.g., an application function) which may be owned and operated by a third-party entity. More generally, in a 5G core network, each NF provides a defined set of services (acting as service producers) to other NFs (service consumers). Each NF can be a service producer for one service and service consumer for another service. An application server may be considered as an example of an external function, whether or not it is managed by a third party.

Given the above general description of some features of a 5G network, problems with existing security approaches and solutions proposed in accordance with illustrative embodiments will now be described herein below.

Illustrative embodiments propose approaches to security enforcement in a 5G architecture from an end-to-end perspective. With at least one goal of providing a suitable and effective unified schema across the different network domains, illustrative embodiments utilize a policy control framework for the definition and enforcement of security policies in 5G networks. For example, and as will be explained in further detail herein, the PCF is a network function that constitutes, within the SBA architecture, a unique framework for defining any type of policies in the network and delivering those to other control plane NFs.

In accordance with the above-referenced TS 33.501, TS 23.501 and TS 23.502, the SMF determines, at the time of Packet Data Unit (PDU) session establishment, User Plane (UP) security enforcement information for the UP of a PDU session based on subscriber information from the UDM, UP security policy locally configured per Data Network Name (DNN), and/or the slice in the SMF and/or the maximum supported data rate per UE for integrity protection per Data Radio Bearer (DRB). The local security configuration in the SMF has been considered sufficient for globally applicable and static policies.

Illustrative embodiments propose to provide dynamic UP security enforcement within the session management and established security policies to consider security as a quality element of the network. Application of quality-of-service (QoS) principles to security enforcement has not been considered yet in communication networks.

As mentioned in the above-referenced TS 23.288, the NWADF appears in Release 15 as part of the SBA architecture, and in Release 16 it has been extended to non-slice-specific analytics, with a few security related use cases around denial-of-service (DOS) detection. There can be multiple NWDAFs specialized in different types of analytics, identified by analytics ID Information Element (IE). This IE is used to identify the type of supported analytics that NWDAF can generate. The NWDAF interacts with different entities for different purposes, such as data collection based on subscription to events provided by different network functions, retrieval of information from data repositories and NFs, and on-demand provision of analytics to different kinds of consumers. Thus, illustrative embodiments enhance the NWDAF to allow collection of security relevant analytics.

Upon reception of a UE request for a new PDU session, the SMF manages the entire lifecycle of the session. Currently, the PDU request does not include any security parameter or attribute as in the case of QoS (e.g., number of supported packet filters for a single QoS rule), thus a priori it is not possible for a UE to request specific 5G UP security services, i.e., secure PDUs. Some mission critical applications may require special security provisions in the PDU session between UE and a Data Network (DN), by way of example only, strong cyphering algorithms or longer encryption keys in certain service flows supported by certain DRBs.

Moreover, no security attributes triggering mitigation actions in the case of a security incident at the PDU level have been proposed in existing approaches.

The question is whether the existing static approach will still be valid for upcoming use cases, where subscription plans can be related with security added value services and corresponding tenants (e.g., owner of a critical infrastructure) requiring different levels of security (e.g., per slice) and the ability to react to security incidents. Those use cases will require scalability, flexibility and dynamicity in the policy management and configuration beyond the existing local approach.

From an enforcement perspective, the implementation of security policies and QoS parameters in the network differ widely in mobile networks. There is no standardized approach. Thus, it would be beneficial to provide for automated and intelligent security enforcement, assurance and enhancements across multi-vendor environments.

However, it is realized herein that there are challenges to such an approach, e.g., how to apply QoS principles to security enforcement, how to quantitatively measure security parametrization in terms of integrity protection, confidentiality protection, access control, malware detection, etc. Further, a data collection feature currently permits the NWDAF to retrieve data from Control Plane (CP) sources for slices or groups of UEs, but it does not provide for collecting UP security related data from the UPF. Existing approaches are currently limited to traffic volumes and data rates. Only measurements and trace data are collected by Operation, Administration and Management (OAM) systems, which can be shared with the NWADF via a Management Service.

In existing approaches, security enforcement information only indicates whether UP integrity and confidentiality protection need to be applied in the NG-RAN network area, and only for 3GPP type of access. The extension of UP security enforcement from the NG-RAN to transport and core network areas up to the target DN is not currently part of existing approaches, i.e., there is no end-to-end security enforcement approach across the entire connectivity provided by the PDU session. Illustrative embodiments provide such end-to-end security enforcement.

Figure 3:
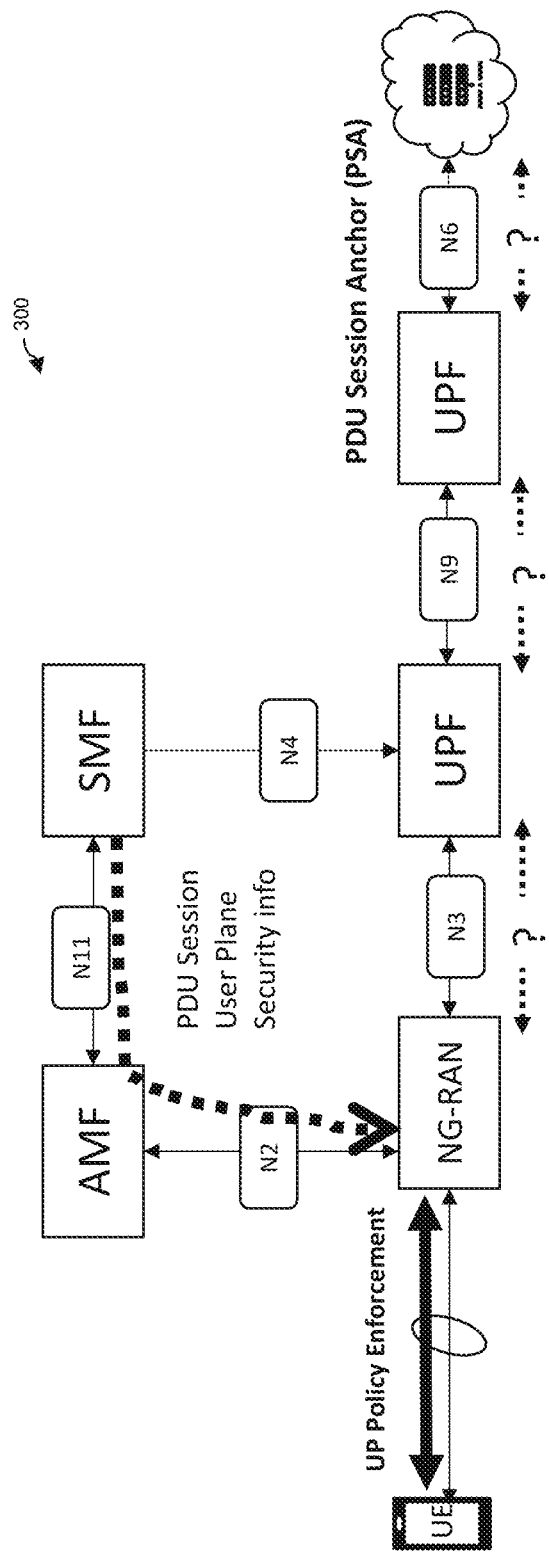
FIG. 3 illustrates user plane security enforcement limited to enforcement between user equipment and an access point of a communication network.

FIG. 3 illustrates a communication network 300 with current UP security enforcement. Once the PDU session is established, the current characterization of the session (i.e. PDU session information) is limited to a few information elements mainly related to QoS (e.g. QoS Flow Identifier, Reflective QoS Indicator), and there are no security attributes triggering mitigation actions in case of a security incident at PDU level. For example, applications dealing with secret classified data may require special security provisions in the Packet Data Unit (PDU) session between UE and a Data Network, like strong cyphering algorithms or longer encryption keys in certain service flows supported by certain Data Radio Bearers (DRB). With the exception of the air interface (between the UE and the NG-RAN in communication network 300 of FIG. 3), the security enforcement in the UP in the rest of the network is configured locally and statically per network segment, without a consistent end-to-end policy across the network.

Further, section 6.7.5.2 of the above-referenced TS 23.288 describes exceptions information collected to identify data flows of UEs with abnormal behavior. However, this does not imply that the collected information is security related data.

Illustrative embodiments extend the current scope of this collected data to generate security related data, contextualizing the abnormal behavioral data with additional data collected from the network, security functionalities embedded in network functions and/or dedicated security network elements (e.g., firewalls, intrusion detection systems (IDS)). Thus, a main goal is to build security analytics on the top of the existing network analytics.

The challenge of how to apply QoS principles to security enforcement and how to enable quantification of security characteristics in the network has no existing unified approach. Traditionally, security enforcement mechanisms are static and exclusively preventative, e.g., policies deployed in firewalls in the perimeter such as, for example, sGi (EPC) or N6 (SGCN) core network interfaces towards the Internet.

The evolution of security managements systems such as SIEM (Security Incident and Event Management) to SOAR (Security Operations, Automation and Response) attempt to cope with the challenge of automatically and intelligently reacting to security incidents by the design and implementation of security workflows in the enterprise network.

It is realized herein that QoS profiles can be dynamically established by the SMF in the 5G access network. QoS profile is well defined as the set of QOS parameters applied to a QoS flow (QOS flow is the finest granularity of QoS differentiation in a PDU session). Such parameterization is quantitative, i.e. it can be measured with numerical digits. For example, the 5G QOS Identifier is a parameter represented by a scalar used as a reference to 5G QoS characteristics like scheduling, weights, admission thresholds, etc. There are even pre-configured standardized values. The SMF manages QoS flows with rules, associating traffic filters with QoS policies coming from the PCF. 3GPP 5G policy control mainly focuses on QoS. QoS rules can be enforced to the UE through Session Management (SM) signalling over the NI interface from the SMF (via the AMF), or directly on the UPF over N4. N1 is the reference point between UE and AMF to exchange Non-Access Stratum (NAS) messages. N4 is the reference point between the SMF and the UPF to manage data sessions at the user plane. N4 is based on the Packet Forwarding Control Protocol (PFCP).

Illustrative embodiments provide for dynamic UP security enforcement within the session management and established security policies to consider security as a quality element of the network. Further, an end-to-end approach to security enforcement in 5G architectures enforces UE behaviour related to security policies. As will be further explained, QoS profiles are enhanced with specific security policy rules, and the UPF is enhanced with a security filter set allowing unified handling across the network.

Currently, security policies are configured locally in the SMF. In contrast, illustrative embodiments provide enforcement of security policies on UP traffic under the policy control framework. Acting directly on the AMF and on the SMF control network functions, the PCF reaches the UE, Radio Access Network (RAN) and the UPF to apply those policies directly on the UP.

Illustrative embodiments enable the PCF to act on different parts of the network to deploy security policies on the AMF and the SMF, which are then enforced in the UE, RAN and UPF. For the Policy and Charging Control (PCC) decision performed by the PCF, the NWDAF (or any other analytics function) provides information that contributes significantly to the process and final conclusion which the security policy needs to be activated.

Accordingly, illustrative embodiments enable an effective unified schema across the different network domains, allowing the extension of the existing policy control framework to also become the cornerstone for the definition and enforcement of security policies in 5G networks. A unified 5G policy framework provides for an effective security enforcement schema flexible to create new security policies, and agile to react to the constantly changing environment, across the end-to-end architecture.

Mechanisms to apply the QoS principles to security use cases are defined in accordance with illustrative embodiments. For example, new QoS policies could be applied restrictively and dynamically from the PCF into the network at the reception of security events or incidents, which may be created, e.g., at a security analytics platform looking at the UP (e.g., SIEM tools placed in the management plane, IDS systems embedded in UPF, etc.).

Furthermore, a pre-defined security indicator is defined in accordance with illustrative embodiments. Advantageously, different policies can be enforced from the PCF, working de facto as an efficient mitigation mechanism in the network to perform tasks including, but not limited to: (i) set up a new session Aggregate Maximum Bit Rate (AMBR); (ii) set up a new UE AMBR (e.g., quarantine UE that is an active bot of a DOS attack); and (iii) set up a new PDU session with more restrictive security controls in the QoS profile.

In illustrative embodiments, the PCF is the policy decision point for security, while other NFs/parts of the network are the enforcement points of security policies.

Further, an interface to the management plane for policy administration, and support of the decision, e.g., to a central security management system, are defined in accordance with illustrative embodiments.

Analytics information is currently limited to slice-specific network status, e.g., load level information. That is, it is not required to be aware of subscribers using the slice, but it works at network slice level. Thus, illustrative embodiments extend the load level information adding security contextual information (e.g., events, attacks, vulnerabilities, etc.). The feed of the security function is implemented separately (a new NF) or as part of the standardized network functions, such as the UPF with embedded firewall capabilities, into the NWDAF. This means, security network elements such as firewalls, or security features (e.g., host IDS) implemented in SBA network functions such as the UDM, or UP NFs such as the UPF, are able to report security related data to the NWDAF. This can be implemented in multiple ways, e.g., specific application programming interfaces (APIs) per network function exposing such security data, such that the NWDAF would subscribe to those, or the NWDAF could have an open interface where this information can be pushed from the different network functions.

It is further proposed, in accordance with illustrative embodiments, to introduce a new NF or enhance the existing network analytics of NWDAF with new security use cases. Attack information can be used to provide alerts to OAM or notifications to other 5GC NFs that have subscribed to such a service.

First, illustrative embodiments with security policy enforcement via the AMF are proposed. Two types of policies for access and mobility managed and enforced by the AMF are proposed, which are dictated by the PCF and stored in the UDR. In this manner, security use cases can be supported without major changes in the policies definition:

(i) Policies transferred from the PCF to the AMF:
Service area restrictions: Illustrative embodiments establish different security levels per service area (TA: Tracking area), using thresholds to determine whether the user is entitled to move or not to a higher security service area. Example: sensitive geographical areas hosting critical infrastructure may restrict the access to users generating a SUCI using 'null schema' (i.e., non-protected subscriber permanent identifier) in order to prevent, for example, the impact of rogue base stations or tracking/eavesdropping type of attacks, or on the other side, allowing access only to those users supporting UP integrity protection in the air interface.

Priorities of access types the user may use. The proper definition of those priorities can prevent bidding down attacks enforcing the UEs to connect to more vulnerable networks such as 2G networks, which are much more prone to be compromised than 4G or 5G networks.

(ii) Policies transferred from the PCF to the UE via the AMF:
UE route selection policy to determine how to route egress traffic (PDU selection policies). A new PDU session can be triggered in a case of a security incident (e.g., malware detection in the UE), i.e., a quarantine PDU with special policies across the data path, or a PDU terminated in a secure DN with special security services (e.g., scrubbing center).

Second, illustrative embodiments with security policy enforcement via the SMF are proposed. SMF controls the functions supported by the UPF, including security related functionalities such as firewalling, throttling, DoS protection, GPRS Tunneling Protocol (GTP) inspection (new Inter PLMN UP Security in Release 16). In addition, the SMF controls the policy enforcement, i.e., the interaction with the PCF to get the policy rules and apply them into the UPF directly or into other parts of the network such as NG-RAN via the AMF. Thus, illustrative embodiments provide that the security controls embedded in the UPF are managed by security policies in the PCF.

Furthermore, illustrative embodiments enable UP security enforcement policies (confidentiality and integrity protection) in the air interface (i.e., between UE and 5G-AN) to be managed in the PCF (instead of being locally configured in the SMF as is conventionally done), which retrieves them from the UDR, as storage of policy profiles with predefined security policies. Therefore, those policies are part of the dynamic PCC Rules dedicated to UP security, and potentially extended to other domains and UP interfaces such as N6 (reference point between the UPF and packet data networks based on, e.g., IP or Ethernet transport), N3 (reference point between the 5G-RAN and the UPF based on GPRS Tunneling Protocol User Plane, GTPv1-U) and N9 (reference point between two UPFs to transmit user plane data, also based on GTPv1-U).

The following use cases illustrate how illustrative embodiments can be utilized to enforce security policies across the network:

(i) TS 33.501 states that the transport of user data over N3 shall be integrity, confidentiality and replay-protected.

The required mechanism is IPSec ESP and IKEv2 certificate-based authentication. However, the use of cryptographic solutions to protect N3 is an operator's decision. These types of solutions could be selectively deployed based on the security level offered to a group of users, slices and/or tenants, depending on the requirements and criticality of the service or infrastructure. For example, private networks serving critical infrastructure (e.g., utilities) will certainly require full protection of the communications between radio stations and core, even in addition to the security mechanisms applied at application level. Illustrative embodiments include cryptographic solution activation in N3 as part of the PCC rule to be enforced on the gNB (via the AMF) and the Security Gateway part of the UPF system (via the SMF). The enforcement creates a new IPSec tunnel or allocates the PDU to an existing IPSec tunnel.

(ii) Security mechanisms apply to N9 for certain use cases such as the interconnection with another operator. In this context, GTP inspection or IPSec are already standardized as security mechanisms, but not the enforcement via PCF as part of a security service level agreement (SLA).

(iii) As per detection of a fake base station in a certain area network, or simply looking at a certain critical area from the point of view of security (e.g., airports, critical infrastructure sites, etc.), the PCF is configured to enforce integrity protection to the relevant UEs/group of UEs attached to the base stations in this network geographical area.

Figure 4:
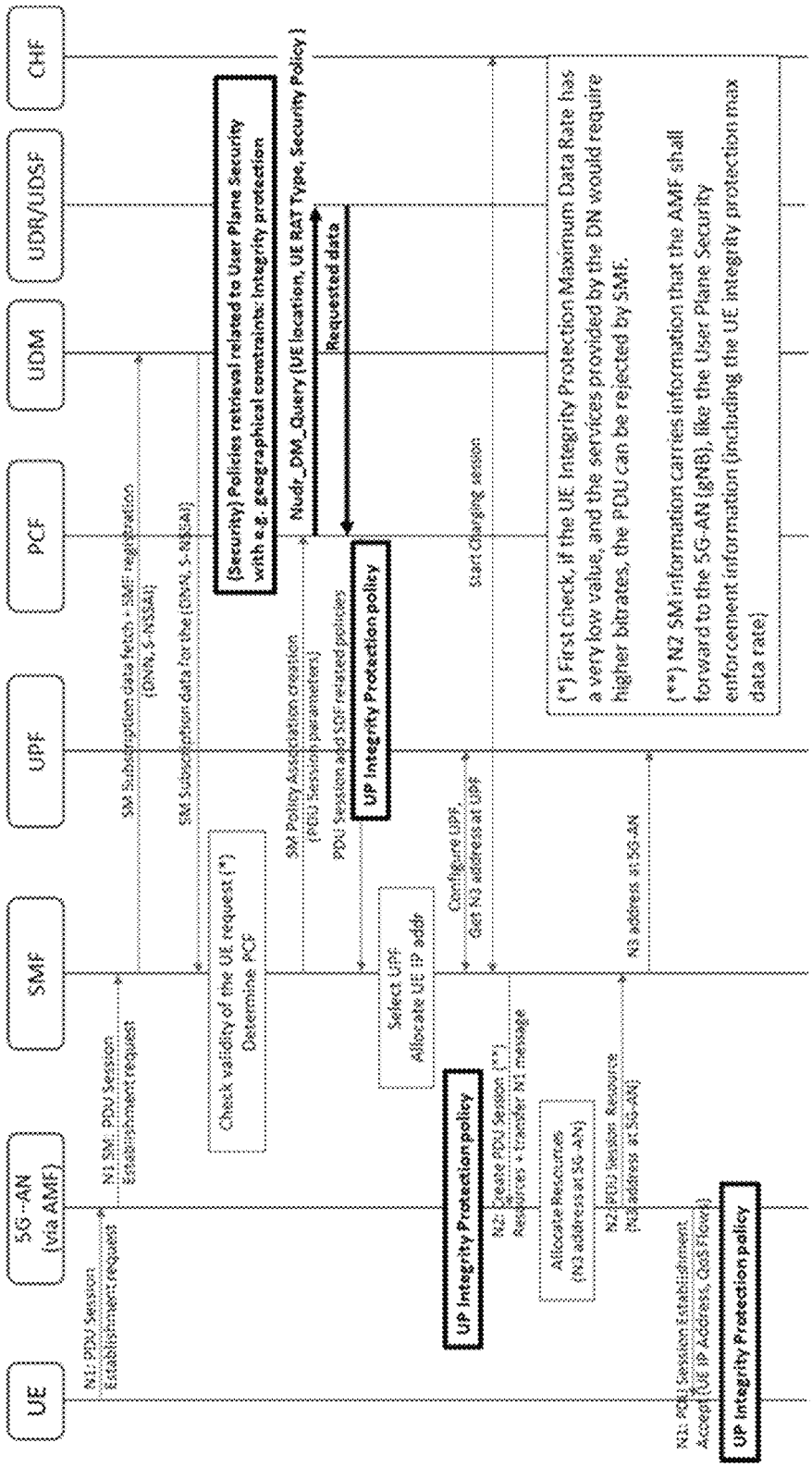
FIG. 4 illustrates a flow process for dynamic enforcement of security policies associated with one or more network functions in a communication network, according to an illustrative embodiment.

FIG. 4 illustrates an overall flow process 400 according to illustrative embodiments. As shown, in accordance with PDU session establishment, illustrative embodiments introduce calls to be executed to provide the described dynamic enforcement of security policies from the PCF.

Figure 5A:
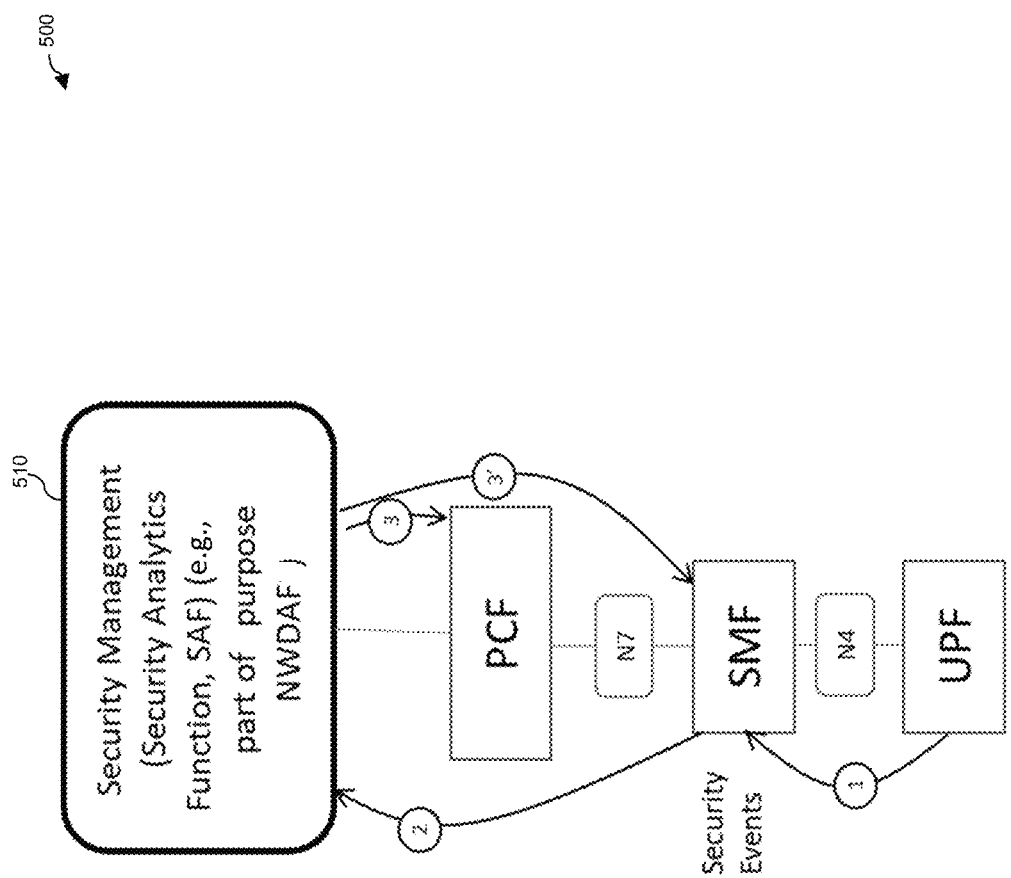
FIGS. 5A and 5B illustrate further details of dynamic enforcement of security policies associated with one or more network functions in a communication network, according to an illustrative embodiment.

FIG. 5A illustrates details of a process flow 500 between network functions according to an illustrative embodiment. An objective is that the SMF creates security policies based on analytics data received from a Security Analytics Function or SAF 510 (currently those policies are locally configured). If there is any kind of security incident, the SMF provides information to the analytics platform (labelled 2 in FIG. 5A). The SMF can also collect information from UPF (labelled 1 in FIG. 5A). The assumption is that the UPF has the capability of gaining threat intelligence. The security management system (SAF 510) is responsible for creating security incidents, and triggering actions on the PCF (labelled 3 in FIG. 5A) and/or the SMF (labelled 3' in FIG. 5A), e.g., informing the PCF that certain security SLAs have been crossed, redirect the user traffic to, for example, a scrubbing center or dedicated security DNs, etc.

Figure 5B:
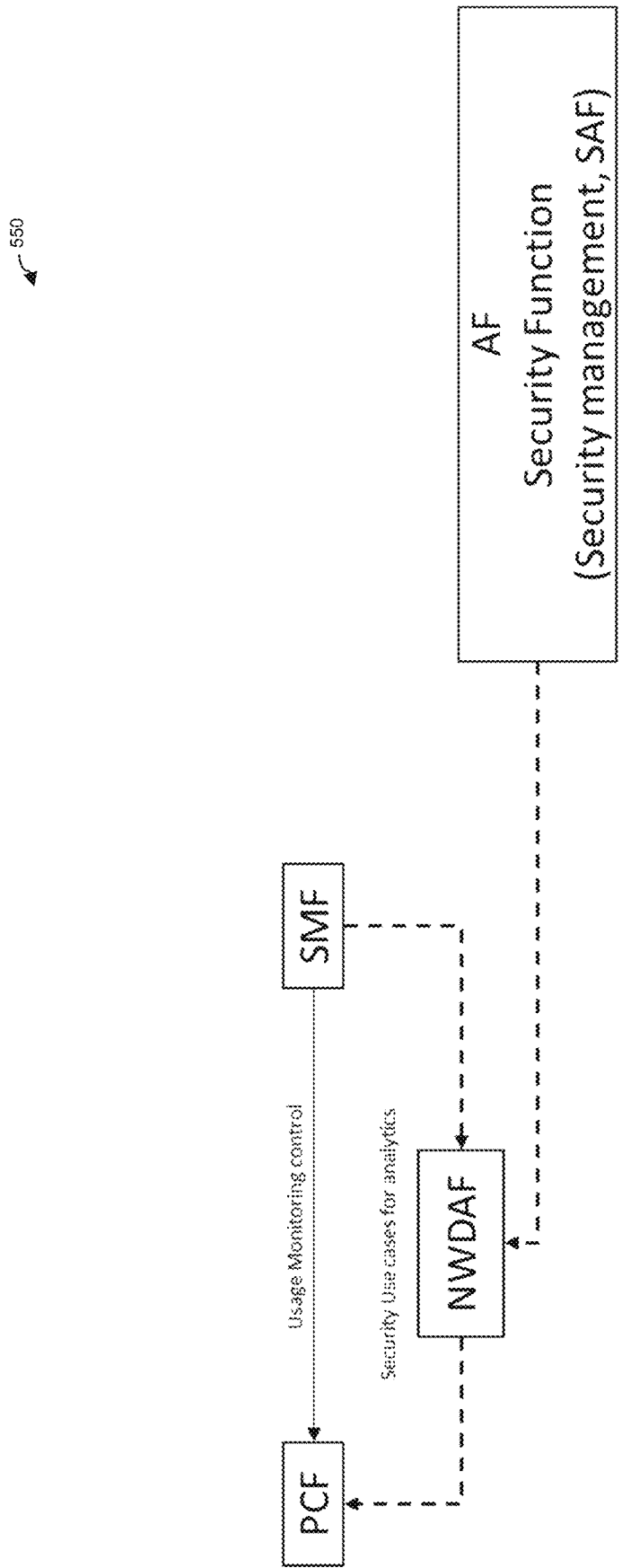

More specifically, if there is a security incident reported in SAF or NWDAF-SAF or another security analytics function, the SAF processes this information and feeds it to the PCF or the PCF is subscribed (3). Then, the PCF can be based on this and form a security policy and provide the policy to the SMF (N7). Alternatively (3'), the information can be fed directly to the SMF. FIG. 5B illustrates a configuration 550 showing the interaction/interconnection of the above-mentioned components. Note that the SAF can be part of the NWDAF, a purpose NWDAF, or a separate analytics function.

Figure 6:
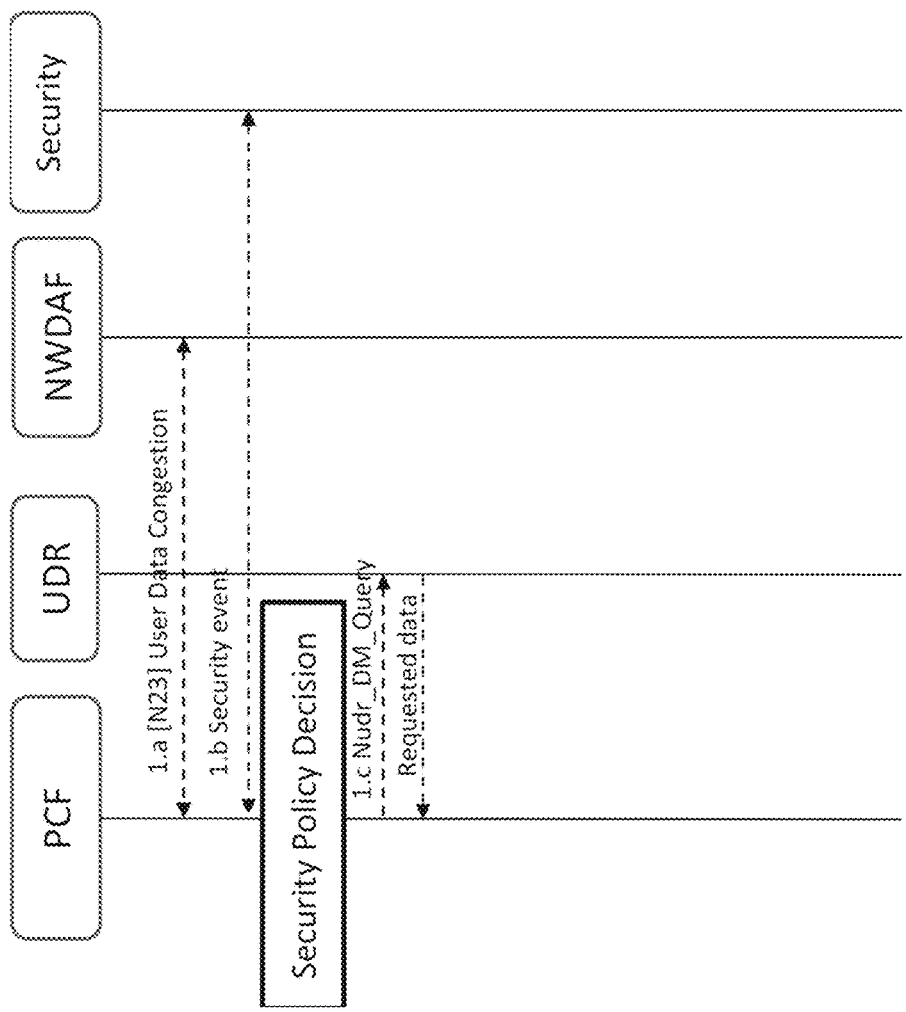
FIG. 6 illustrates multiple processes for a network function to obtain security insights on a policy decision, according to an illustrative embodiment.

FIG. 6 depicts a part of a communication network 600 illustrating multiple ways for the PCF to gain security insights on a policy decision:

1.a NWDAF to PCF: PCF is subscribed to NWDAF notifications. Due to a security incident in the network (e.g. DoS attack), a user data congestion situation is found, that is communicated in a message to the PCF via N23 interface (N23 is the reference point between PCF and NWDAF).

1.b. Security Management to PCF: A security management system has been integrated with the PCF via a REST API. A security event is reported to the PCF.

1.c. PCF to the UDR: PCF requests a set of data from the UDR via N36 (N36 is the reference point between PCF and UDR). In this use case, it can be an identifier of a security policy part of the subscription set of policies, to be applied in case of a security incident.

Furthermore, illustrative embodiments propose different types of NWDAFs, specialized in different types of analytics, identified by analytics ID information element.

The PCF can consume this information via the N23 interface. Some of that information can provide very useful information for the security analysis and further enforcement as described above.

In one illustrative embodiment, it is proposed to enhance Table 7.1-2 of the above-referenced TS 23.288 as shown in FIG. 7 (enhanced table 700). The first three leftmost columns of table 700 show the analytics information provided by the NWDAF service. The rightmost column is added in table 700 showing security information that is extracted for other security analytics functions for further analysis or sent directly to (or retrieved from) the PCF framework for application of specific security PCC rules.

Particularly of interest for security analytics is the abnormal behavior related network data analytics captured by the NWDAF. The PCF can subscribe to notifications of network analytics related to abnormal behavior using the Nnwdaf_AnalyticsSubscription_Subscribe service operation, with the aim of anticipating and detecting a security issue, triggering a new security policy or updating an existing one for the particular UE or group of UEs.

To allow the specific subscription to the security relevant parts of analytics information, illustrative embodiments propose to have an additional category that the consumer of security analytics information can indicate in addition to the name of the analytics information for which they are interested. This indication can be a Boolean for requesting the additional security information or if the security information has subcases, a number or term indicating which of the security information to be sent together with the analytics information, e.g., subscribe for "Observed service experience statistics or predictions" with security=True.

This data includes the Analytics ID (abnormal behavior), the target of analytics reporting 'SUPI', 'Internal Group Id' and the analytics filter including the list of Exceptions IDs, and per each Exception ID a possible threshold. The current list of Exception IDs is specified in the above-referenced TS 23.288, e.g., 'unexpected UE location', 'suspicion of DDoS attack', 'wrong destination address', etc. Examples of policies and actions to mitigate the risks include, e.g., 'extension of Service Area restriction', 'release the PDU session', 'updates the packet filter/QoS', etc.

The challenge is that at the UP level, the communication description per application is limited to the traffic volume and data rates of this communication, i.e., what is relevant for security incidents related to volumetric type of attacks (e.g., flooding, overload, DoS, etc.). Changes or anomalies in the statistics or predictions, for example, the periodicity of the UE communications, duration of the communications or certain traffic characterization (e.g., unusual ports, suspicious DNN, other useful information, etc.), volumes Upload/Download (average and variance) may indicate a security event or incident.

At the UP level, illustrative embodiments propose that, on the top of volumes, changes and anomalies, the NWDAF can directly collect real security events (facts) from the UPF, due to UP security inspection functionalities attached or embedded in it. This security information may be consumed by active NFs such as the PCF to update dynamically the PCC rules for a particular UE of group of UEs, change a PDU or even take actions at slice level if required.

In one or more illustrative embodiments, a new NF can be dedicated for handling security analytics. A security analytics function could use artificial intelligence/machine learning (AI/ML) to learn from events. For example, the security analytics function uses a policy/rules database to feed information for learning into the analytics module. If it detects malicious network flows or activities within the core network, this information is fed again into the learning engine and allows continuous learning and updating of trained models.

While the above illustrative embodiments focus on enforcing policies, the following illustrative embodiments (which can be combined or operate separately) focus on applying QoS policy rules for security by enabling policy decisions on security and the actions triggered from the PCF to modify QoS policies. In accordance with one illustrative embodiment, a new traffic filter set called security filters set is configured in the UPF to manage security services, e.g.:

(i) Security association identified by a particular Security Parameter Index for a particular group of UEs or slice with special security requirements (e.g., crypto-algorithm, key lengths, etc.); and (ii) Detection and dynamic QoS rules such as traffic gating can be applied.

Figure 8:
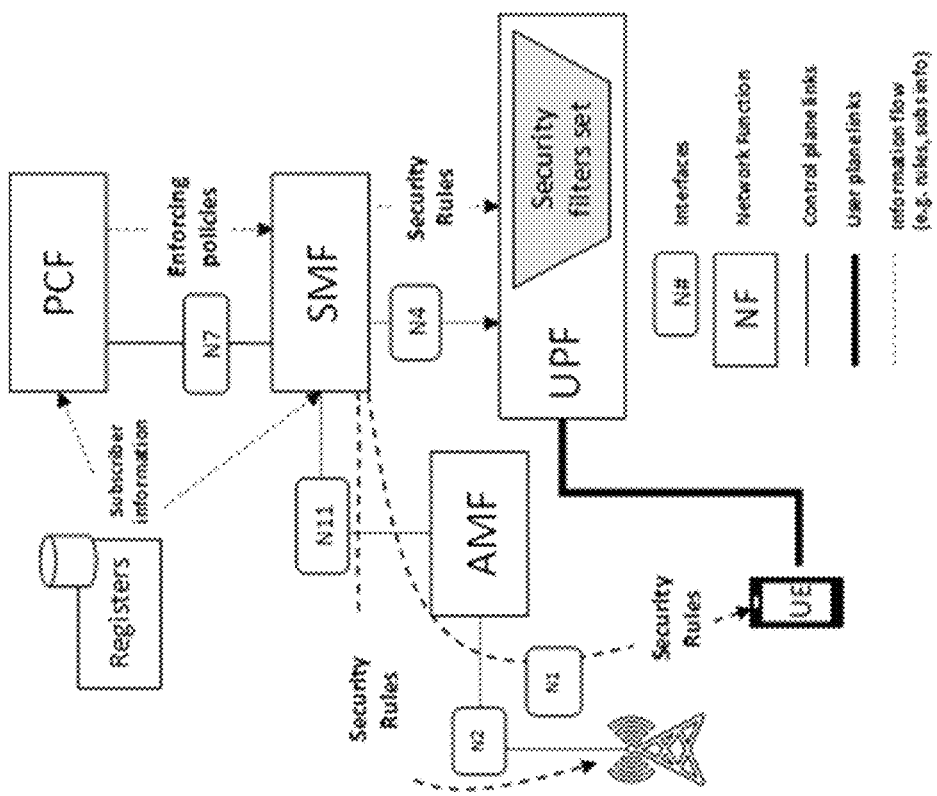
FIG. 8 illustrates a concept of applying security rules as part of quality-of-service policies in a communication network, according to an illustrative embodiment.

FIG. 8 depicts part of a communication network 800 illustrating the concept of applying security rules as part of the QoS policies in the network.

Figure 9:
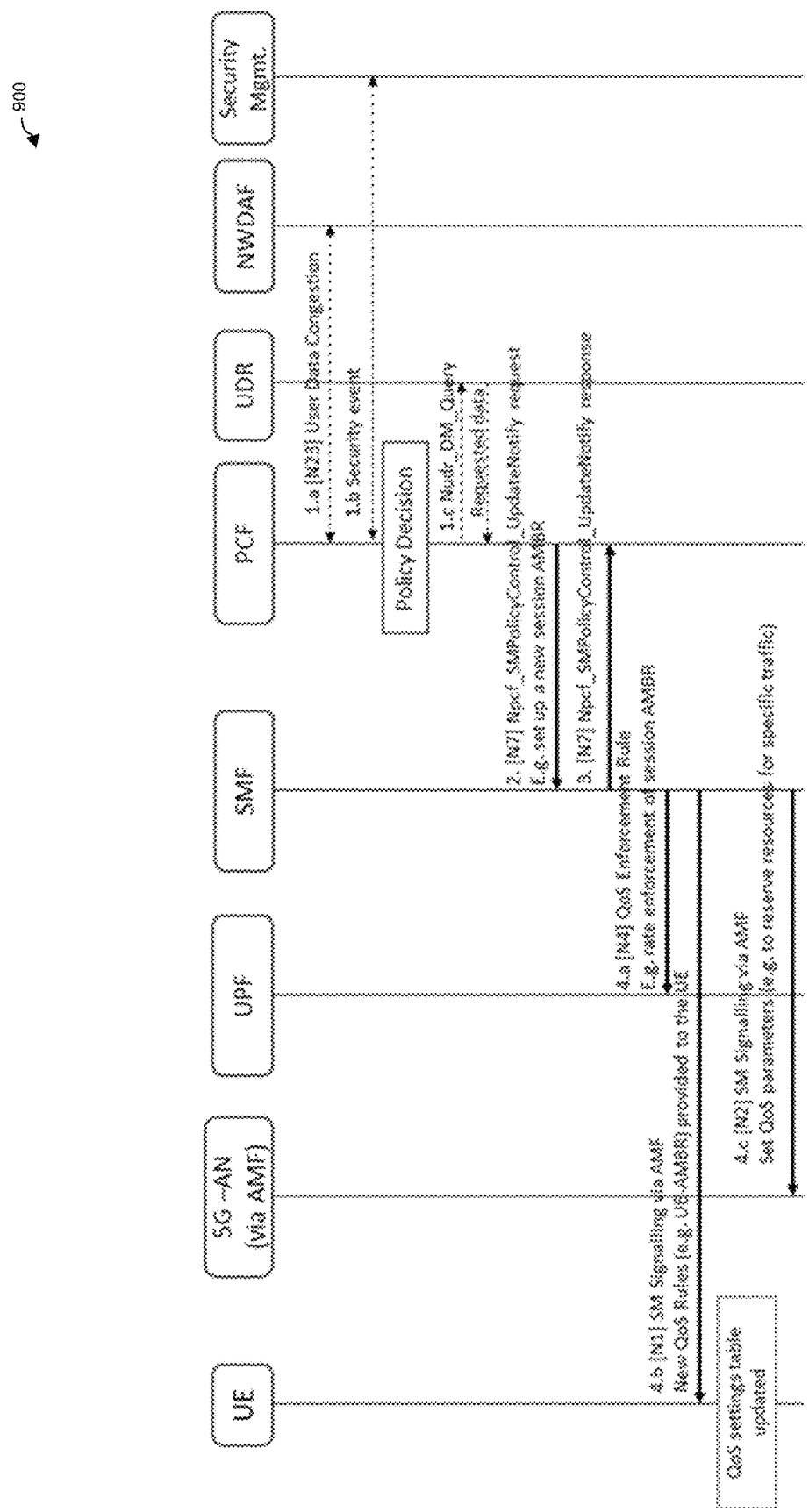
FIG. 9 illustrates a security call flow for applying security rules as part of quality-of-service policies in a communication network, according to an illustrative embodiment.

One example of a security call flow implemented by this concept is shown [ibn] in call flow 900 of FIG. 9. As shown:

1.a NWDAF to PCF: PCF is subscribed to NWDAF notifications. Due to a security incident in the network (e.g. Denial of Service attack) we found a situation of user data congestion, that is communicated in a message to PCF via N23 interface (N23 is the reference point between PCF and NWDAF).

1.b. Security Management to PCF: A security management system has been integrated with PCF via REST API. A security event is reported to PCF.

1.c. PCF to UDR (optional): PCF requests a set of data from UDR via N36 (N36 is the reference point between PCF and UDR). In this use case it could be an identifier of a security policy part of the subscription set of policies, to be applied in case of a security incident.

2. PCF to SMF: After policy decision is taken, the PCF has determined that SMF needs updated policy information to mitigate the security issue, and issues a Npcf_SMPolicyControl_UpdateNotify request via N7 with an updated policy information about the PDU session, in this case set up a new Session-AMBR.

3. SMF to PCF: The SMF acknowledges the PCF request.

4.a. SMF to UPF: QoS enforcement based on QoS Enforcement Rule sent by the SMF is a function offered by UPF. This includes rate enforcement of session AMBR (received from PCF in SMF in step 2) via N4.

4.b. SMF to UE: Exchange N1 SM signalling (via AMF) with the UE to provide the UE with QoS rule(s), e.g. set up a new UE-AMBR limiting the aggregate bit rate that can be expected to be provided across all Non-GBR QoS flows of all PDU sessions of a UE.

4.c. SMF to 5G AN: Exchange N2 (N2 is the reference point between 5G-RAN and AMF based on Next Generation Application Part) SM signalling (via AMF) to set QoS parameters in the 5G Access Network, e.g. reservation of resources for specific type of traffic.

Thus, as explained herein detail, illustrative embodiments provide the following main parts:

(i) New inputs to the PCF enabling policy decisions on security:

PCF subscription to notifications (e.g., for analytics by NWDAF or from OAM) filtered by security significance (e.g., DoS attack).

Integration with external security management systems via direct REST API (trusted) or through NES (untrusted), so the security event is reported to the PCF via structured information element.

Request service for subscriber security related data/policy from the UDR, as part of the overall subscription set of security policies.

(ii) Actions triggered from the PCF to modify QoS policies dedicated to fix security problems reported in the first part of the solution, towards UPF (e.g., security filter sets), 5G-AN (e.g., reservation of resources for specific traffic) and UE (e.g., limiting the aggregate bit rate).

(iii) Actions triggered from the PCF to the management plane for in-depth analysis, e.g., fraud.

The particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the various embodiments described herein are presented by way of illustrative example only and should not be construed as limiting the scope of the claims. For example, alternative embodiments can utilize different communication system configurations, user equipment configurations, base station configurations, provisioning and usage processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:
a policy control function of a core network operatively coupled to one or more network entities, comprising
at least one processor;
at least one memory storing instructions, that when executed by the at least one processor, cause the policy control function at least to perform:
determining user plane security policies for one or more packet data unit sessions on a user plane of the core network;
enforcing the user plane security policies at the one or more network entities;

subscribing to one or more analytics entities for notifications of security events;

modifying one or more of the user plane security policies based on one or more of the security events; and enforcing the modified user plane security policies at the one or more network entities.

2. The apparatus of claim 1, wherein;
the modifying comprises updating a security filter configured at a user plane function in response to a security event.

3. The apparatus of claim 1, wherein;
the modifying comprises, for an individual one of the packet data unit sessions associated with user equipment, setting up a new packet data unit session or redirecting the individual one of the packet data unit sessions to a center to quarantine the user equipment in response to a security event.

4. The apparatus of claim 1, wherein;
the modifying comprises, for an individual one of the packet data unit sessions, releasing the packet data unit session in response to a security event.

5. The apparatus of claim 1, wherein;
the modifying comprises, for an individual one of the packet data unit sessions, allocating the individual one of the packet data unit sessions to an existing internet protocol security tunnel or creating a new internet protocol security tunnel on at least one of an N3 interface, an N6 interface, and an N9 interface.

6. The apparatus of claim 1, wherein;
the subscribing comprises subscribing to the notifications of the security events filtered by security significance.

7. The apparatus of claim 1, wherein;
the subscribing comprises subscribing to a network data analytics function for the security events.

8. The apparatus of claim 1, wherein:
the subscribing comprises subscribing to a security management system for the security events via an application programming interface.

9. The apparatus of claim 1, wherein the at least one memory and the at least one processor further cause the policy control function at least to perform:
requesting, for user equipment, a security policy part of a subscription for the user equipment from a unified data repository to be applied in response to a security event.

10. The apparatus of claim 1, wherein:
the enforcing comprises enforcing the modified user plane security policies on an N9 interface.

11. The apparatus of claim 1, wherein:
the enforcing comprises enforcing the modified user plane security policies on an N6 interface.

12. A method comprising:
in a policy control function of a core network operatively coupled to one or more network entities:
determining user plane security policies for one or more packet data unit sessions on a user plane of the core network;
enforcing the user plane security policies at the one or more network entities;
subscribing to one or more analytics entities for notifications of security events;
modifying one or more of the user plane security policies based on one or more of the security events; and
enforcing the modified user plane security policies at the one or more network entities.

13. The method of claim 12, wherein:
the modifying comprises updating a security filter configured at a user plane function in response to a security event.

14. The method of claim 12, wherein;
the modifying comprises, for an individual one of the packet data unit sessions associated with user equipment, setting up a new packet data unit session or redirecting the individual one of the packet data unit sessions to a center to quarantine the user equipment in response to a security event.

15. The method of claim 12, wherein:
the modifying comprises, for an individual one of the packet data unit sessions, releasing the packet data unit session in response to a security event.

16. The apparatus of claim 12, wherein:
the modifying comprises, for an individual one of the packet data unit sessions, allocating the individual one of the packet data unit sessions to an existing internet protocol security tunnel or creating a new internet protocol security tunnel on at least one of an N3 interface, an N6 interface, and an N9 interface.

17. The method of claim 12, wherein:
the subscribing comprises subscribing to the notifications of the security events filtered by security significance.

18. The method of claim 12, wherein:
the subscribing comprises subscribing to a network data analytics function for the security events.

19. The method of claim 12, wherein;
the subscribing comprises subscribing to a security management system for the security events via an application programming interface.

20. An article of manufacture comprising a non-transitory computer-readable storage medium having embodied therein executable program code that when executed by a processor causes the processor to perform the steps of:
in a policy control function of a core network operatively coupled to one or more network entities:
determining user plane security policies for one or more packet data unit sessions on a user plane of the core network;
enforcing the user plane security policies at the one or more network entities;
subscribing to one or more analytics entities for notifications of security events;
modifying one or more of the user plane security policies based on one or more of the security events; and
enforcing the modified user plane security policies at the one or more network entities.

* * * * *